(No Model.)

J. WEATHERS.
COMBINED VISE, DRILL, AND ANVIL.

No. 516,288. Patented Mar. 13, 1894.

Witnesses.
L. A. Minturn
Wm Hoafn

Inventor
James Weathers,
By Joseph A. Minturn
Attorney.

UNITED STATES PATENT OFFICE.

JAMES WEATHERS, OF INDIANAPOLIS, INDIANA.

COMBINED VISE, DRILL, AND ANVIL.

SPECIFICATION forming part of Letters Patent No. 516,288, dated March 13, 1894.

Application filed December 18, 1893. Serial No. 493,953. (No model.)

*To all whom it may concern:*

Be it known that I, JAMES WEATHERS, a citizen of the United States, residing at Indianapolis, in the county of Marion and State of Indiana, have invented certain new and useful Improvements in a Combined Vise, Drill, and Anvil; and I do hereby declare the following to be a full, clear, and exact description of the invention, such as will enable others skilled in the art to which it appertains to make and use the same.

The object of this invention is, primarily, to provide an inexpensive tool for the use of mechanics and for others such as farmers and those who have occasional calls for diversified work, that would ordinarily require a number of different tools and be too expensive for general ownership; my object being to so construct the several parts that they will act harmoniously to perform their joint work in a perfect manner and not, as is often the case with combined tools, sacrificing some of the efficiency for the sake of the combination. I accomplish the objects of the invention by the mechanism illustrated in the accompanying drawings in which—

Figure 1:
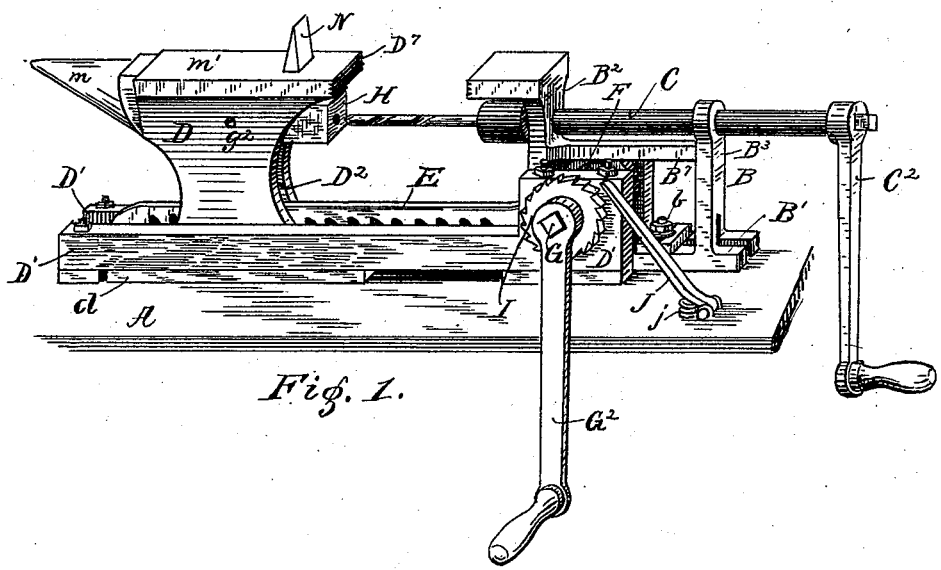
Figure 2:
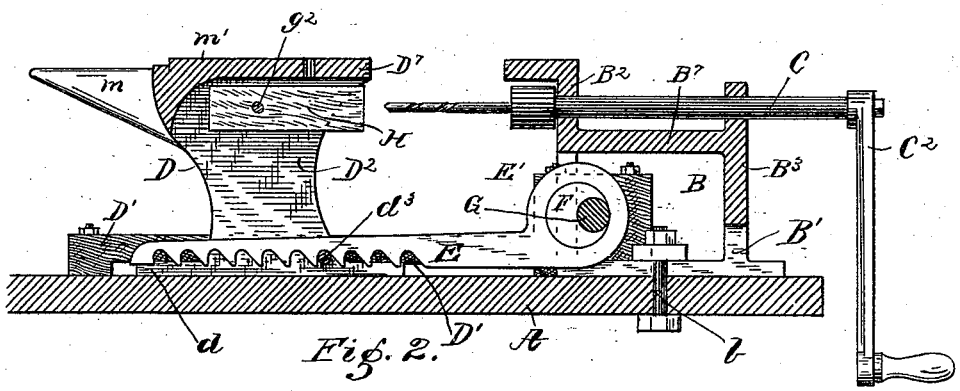

Figure 1 is a view in perspective of my complete device showing the tool in position for drilling, and Fig. 2 is a view in longitudinal section of same.

Similar letters refer to like parts throughout both views of the drawings.

A is the bench or table upon which the tool is mounted and is secured by bolting, or by means of screws or in any substantial manner.

B is the head block, preferably of metal as cast iron, and is bolted to the bench A by means of the bolt $b$. The base B' of the head block is slotted longitudinally and the bolt $b$ projected through said slot. This construction allows the head block to be adjusted in its position on the bench.

$B^2$ is the front and $B^3$ the rear standard of the head block and both are cast integral with the base. They are connected near their upper ends by the brace bar $B^7$.

C is the drill bar journaled to the upper ends of the standards $B^2$ and $B^3$ and is rotated by means of the crank $C^2$ which is removably secured to the outer end of the bar as shown. The inner end of the bar is provided with a socket or a suitable chuck for receiving and holding the drill or bit.

D is the tail block and is movable, along the top of the bench, the direction of the movement being controlled by the guides D'. These guides will be preferably made of wood and are bolted, one on each side of the tail block, and they are each cut away on their under sides so as to form a longitudinal slot between the guides and the top of the bench to receive the flanged base $d$ of the tail block D. The tail block will be extended vertically so as to form a bearing for the material to be drilled and will be drawn toward the drill so as to give the necessary feed, in the following manner: A vertical slot $D^2$ is made in the body of the tail block and the transverse pin $d^3$, placed so as to connect the two sides and give engagement to the teeth of a reciprocating rack-bar E. This rack-bar is reciprocated by means of the eccentric F fixed to the transverse shaft G and works in the ring E' on the end of the rack-bar. The shaft G is journaled, preferably to the upwardly extended ends of the wooden guides D', although it may be secured to separate journal bearings secured to the head block or to the bench.

$G^2$ is a crank by which the shaft will be revolved and by the action of the eccentric on the rack-bar, will impart a reciprocating movement to the rack-bar. The teeth of the rack-bar are shaped so a forward motion of the bar will engage the pin $d^3$ and pull the tail block forward, but on the return, or backward stroke of the bar, the sloping teeth will cause the bar to slide over the pin and allow the pin to enter the next forward notch on the bar.

In using the drill the right pressure will be readily recognized by the operator who will control the feed by the force applied to the hand crank $G^2$.

H is a boring block which will be thrust into the cleft base of the tail block and will be secured by the pin $g^2$.

The standard $B^2$ is projected up a suitable distance and is then bent forward and fashioned into suitable shape for the jaw of a vise, of which the opposite jaw will be the inner end $D^7$ of the tail-block D, and the two parts of the vise will be forced together by means of the rack bar and cam motion used as the feed for the drill and previously described, but as a feed for a vise it is necessary to provide some means by which the eccentric and rack bar may be locked at any given adjustment. To accomplish this I provide the ratchet wheel I on the shaft G and the pawl J, which is here shown as secured to the bench. The pawl is provided with a spring $j$ so located as to hold the pawl up out of engagement with the ratchet wheel at all times except when needed for use and then it will be pressed down by the operator's hand into engagement with the ratchet wheel.

To still further enhance the value of my tool and without in any manner interfering with its other functions the tail-block will be made in the form of an anvil in which the flanged base to engage the guide bars will also serve to give the requisite solidity as an anvil.

The horn $m$ and the face $m'$ will be of usual construction and the usual opening for the hardy N or other tool, will be provided.

I claim—

In a combined drill and vise, a movable block made in the form of an anvil and adapted to be used as such and also to serve as one of the jaws of the vise and as a bearing for the material to be drilled, a stationary head forming the opposite jaw of the vise and also forming the journals for a stationary drill, a drill journaled to said head block and a stationary shaft having an eccentric secured thereto, a crank to rotate said shaft, a rack bar having a ring to engage said eccentric whereby the rack bar may be reciprocated by the rotation of the shaft and a pin or catch on the movable block by means of which the block may be drawn forward by the rack bar, the parts being combined substantially as described.

In testimony whereof I affix my signature in presence of two witnesses.

JAMES WEATHERS.

Witnesses:
JOSEPH A. MINTURN,
WM. HAFER.